Patented May 18, 1954

2,678,928

UNITED STATES PATENT OFFICE 2,678,928

8-HYDROXY-QUINOLINES WITH HALOGEN-ALKANEMONOCARBOXYLIC ACIDS

Robert Neher, Binningen, Switzerland, assignor to Ciba Pharmaceutical Products, Inc., Summit, N. J.

No Drawing. Application April 14, 1952, Serial No. 282,260

Claims priority, application Switzerland April 20, 1951

9 Claims. (Cl. 260—286)

It is known that 8-hydroxy-quinoline is active against bacteria and also against molds and protozoa. A series of salts of 8-hydroxy-quinoline has also already been prepared. However, on account of their physical properties, these known salts have the disadvantage that they are of limited solubility in various solvents. When they are soluble in water to give stable solutions, they cannot be dissolved in lipoid solvents such as ether; and when they are soluble in lipoid solvents, they do not produce stable aqueous solutions, since they hydrolyze.

The present invention relates to salts of 8-hydroxy-quinolines which possess special properties both in a physical and a pharmacological respect. These are salts of 8-hydroxy-quinoline and 8-hydroxy-alkylquinolines, such as 8-hydroxy-2-methyl-quinoline, with halogenalkane-mono-carboxylic acids of low molecular weight which contain in the $\alpha$- or $\beta$-position at least one halogen atom, primarily a chlorine or bromine atom. Typical representatives of the said acids are for instance monochloracetic acid, dichloracetic acid, trichloracetic acid, monobromoacetic acid, $\beta$-bromo-propionic acid, monoiodoacetic acid and trifluoro acetic acid. Especially valuable are the salts of mono- or di-chloracetic acid.

These new salts are crystalline and form stable solutions in water and also in lipoid solvents. This is especially the case with the aforesaid salts of mono- or di-chloracetic acid, which dissolve almost equally well, for example, in ether and in water.

Moreover, the new salts exhibit a better pharmacological activity than the aforesaid 8-hydroxy-quinolines or their known salts.

It has been found that, e. g. the 8-hydroxy-quinoline dichloracetate in low concentration is more active against *Endomyces albicans, Trichophyton asteroides* or *Microsporon felineum* by the agar disc method in Sabouraud's medium with or without the addition of serum than 8-hydroxyquinoline, 5-chloro-8-hydroxyquinoline or 5-chloro-7-iodo-8-hydroxyquinoline and their known salts. Also against *Trichomonas foetus* the 8-hydroxyquinoline dichloracetate showed a considerably greater activity in the serial dilution method with serum bouillon than 8-hydroxyquinoline or 5-chloro-7-iodo-8-hydroxyquinoline.

The new salts are useful as therapeutic agents, for example, in the form of dusting powders, salves and the like.

The new compounds can be readily prepared. Thus, 8-hydroxy-quinoline or an 8-hydroxyalkylquinoline may be reacted with the desired acid. The compounds can also be obtained by a reaction between easily soluble salts of the aforesaid 8-hydroxy-quinolines and salts of the halogen-alkane-mono-carboxylic acids.

The following examples illustrate the invention, the parts and percentages being by weight unless otherwise stated and the relationship of parts by weight to parts by volume being the same as that of the gram to the cubic centimeter.

Example 1

10 parts of 8-hydroxy-quinoline are dissolved in 50 parts by volume of dry ether, and the solution is mixed with a solution of 6.5 parts of monochloracetic acid in 20 parts by volume of dry ether and then filtered to separate the precipitated yellow crystalline 8-hydroxy-quinoline-monochloracetate melting at 99–100° C. The product dissolves very well in water and also in ether.

Example 2

10 parts of 8-hydroxy-quinoline are dissolved in 50 parts by volume of dry ether, and the solution is mixed with a solution of 8.9 parts of dichloracetic acid in 10 parts by volume of dry ether and then filtered to separate the precipitated yellow crystalline 8-hydroxy-quinoline-dichloracetate melting at 107–108° C. The product is non-hygroscopic, is soluble in water to give a solution of about 30 per cent. strength and also has a good lipoid solubility.

Example 3

10 parts of 8-hydroxy-quinoline are dissolved in 50 parts by volume of dry ether, and the solution is mixed with a solution of 11.3 parts of trichloracetic acid in 20 parts by volume of dry ether and then filtered to separate the precipitated yellow crystalline 8-hydroxy-quinoline-trichloracetate melting at 127–128° C.

Example 4

10 parts of 8-hydroxy-quinoline are dissolved in 50 parts by volume of dry ether, and the solution is mixed with a solution of 9.6 parts of monobromacetic acid in 20 parts by volume of dry ether and then filtered to separate the precipitated yellow crystalline 8-hydroxy-quinoline-monobromacetate melting at 97–98° C.

Example 5

10 parts of 8-hydroxy-2-methyl-quinoline are dissolved in 50 parts by volume of dry ether, and the solution is mixed with a solution of 8.1 parts of dichloracetic acid in 20 parts by volume of dry ether and then the ether is distilled off. 8-hydroxy-2-methyl-quinoline dichloracetate remains behind in the form of a reddish-yellow resinous product which crystallizes slowly.

Example 6

10 parts by weight of 8-hydroxy-quinoline are dissolved in 50 parts by volume of dry ether, and the solution is mixed with a solution of 10.5 parts of β-bromo-propionic acid in 20 parts by volume of dry ether. The precipitated yellow crystalline 8 - hydroxy - quinoline - β - bromo - propionate, which has a melting point of 82–84° C., is then filtered off.

Example 7

10 parts by weight of 8-hydroxy-quinoline are dissolved in 50 parts by volume of dry ether, and the solution is mixed with a solution of 12.8 parts of monoiodoacetic acid in 20 parts by volume of dry ether. The precipitated yellow crystalline 8 - hydroxy - quinoline - monoiodoacetate, which has a melting point of 77–79° C., is then filtered off.

Example 8

15 parts by weight of 8-hydroxy-quinoline are dissolved in 75 parts by volume of dry ether, and the solution is mixed with a solution of 11.8 parts of trifluoroacetic acid in 20 parts by volume of dry ether. The precipitated yellow crystalline 8-hydroxy-quinoline-trifluoroacetate, which has a melting point of 172–174° C., is then filtered off.

What is claimed is:

1. A salt of a member selected from the group consisting of 8-hydroxy-quinoline and 8-hydroxy-lower-alkyl-quinolines with a low molecular halogenalkane-monocarboxylic acid which contains at least one halogen atom in one of the positions α and β.

2. A salt of an 8-hydroxy-quinoline with a low molecular halogenalkane-monocarboxylic acid which contains at least one chlorine atom in one of the positions α and β.

3. A salt of an 8-hydroxy-quinoline with a low molecular halogenalkane-monocarboxylic acid which contains at least one bromine atom in one of the positions α and β.

4. A salt of an 8 - hydroxy - lower - alkyl-quinoline with a low molecular halogenalkane-monocarboxylic acid which contains at least one chlorine atom in one of the positions α and β.

5. A salt of an 8 - hydroxy - lower - alkyl-quinoline with a low molecular halogenalkane-monocarboxylic acid which contains at least one bromine atom in one of the positions α and β.

6. 8 - hydroxy - quinoline- monochloracetate.
7. 8 - hydroxy - quinoline - dichloracetate.
8. 8 - hydroxy - quinoline - monobromacetate.
9. 8 - hydroxy - 2 - methyl - quinoline dichloracetate.

No references cited.